US011302178B2

(12) United States Patent
Ikeda et al.

(10) Patent No.: US 11,302,178 B2
(45) Date of Patent: Apr. 12, 2022

(54) MOVABLE BODY MONITORING APPARATUS, AND VEHICLE CONTROL SYSTEM AND TRAFFIC SYSTEM USING THE MOVABLE BODY MONITORING APPARATUS

(71) Applicant: SUBARU CORPORATION, Tokyo (JP)

(72) Inventors: Satoru Ikeda, Tokyo (JP); Haruyo Miyakawa, Tokyo (JP); Hyoungwook Choi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 326 days.

(21) Appl. No.: 16/520,773

(22) Filed: Jul. 24, 2019

(65) Prior Publication Data

US 2020/0105129 A1 Apr. 2, 2020

(30) Foreign Application Priority Data

Sep. 27, 2018 (JP) .............................. JP2018-181321

(51) Int. Cl.
*G08G 1/01* (2006.01)
*B60W 30/095* (2012.01)

(52) U.S. Cl.
CPC ....... *G08G 1/0112* (2013.01); *B60W 30/0956* (2013.01); *B60W 2554/00* (2020.02); *B60W 2556/45* (2020.02)

(58) Field of Classification Search
CPC .. G08G 1/0112; G08G 1/0116; G08G 1/0108; G08G 1/0125; B60W 2554/00; B60W 30/0956; B60W 2556/45
See application file for complete search history.

(56) References Cited

U.S. PATENT DOCUMENTS

| 8,976,041 | B2* | 3/2015 | Buckel | G08G 1/017 340/933 |
| 9,421,909 | B2* | 8/2016 | Strickland | B60Q 9/008 |
| 9,483,948 | B1* | 11/2016 | Gordon | G01S 13/931 |
| 9,607,214 | B2* | 3/2017 | Nerayoff | G06Q 20/02 |
| 9,786,178 | B1* | 10/2017 | Bai | B60Q 5/006 |

(Continued)

FOREIGN PATENT DOCUMENTS

JP 2012012493 1/2012

*Primary Examiner* — Luis A Martinez Borrero
(74) *Attorney, Agent, or Firm* — Chip Law Group

(57) ABSTRACT

A movable body monitoring apparatus is configured to receive movement data related to movements of a movable body. The apparatus includes an acquiring unit, a memory, a detector, and a non-support managing unit. The acquiring unit acquires movement data on a non-support movable body from a support movable body. The memory stores and records the acquired movement data. The detector detects passing of a movable body from the host vehicle. The non-support managing unit manages the movement data on the non-support movable body recorded in the memory. When it is determined that the non-support movable body the movement data on which has been recorded in the memory has passed by based on detection data by the detection of the detector, the non-support managing unit invalidates or deletes the movement data on the non-support movable body from the memory on a movable-body by movable-body basis.

16 Claims, 10 Drawing Sheets

(56) References Cited

U.S. PATENT DOCUMENTS

| | | | |
|---|---|---|---|
| 9,881,503 B1* | 1/2018 | Goldman-Shenhar | ............................ G05D 1/0088 |
| 10,235,882 B1* | 3/2019 | Aoude | .................... G06N 5/046 |
| 10,466,717 B1* | 11/2019 | Su | ........................... G07C 5/008 |
| 10,479,274 B2* | 11/2019 | Park | ........................ B60Q 1/085 |
| 10,559,197 B2* | 2/2020 | Yang | ...................... G08G 1/0145 |
| 10,668,921 B2* | 6/2020 | Ondruska | ........... G01C 21/3635 |
| 10,782,138 B2* | 9/2020 | Kaiser | ............... G08G 1/096775 |
| 10,940,857 B2* | 3/2021 | Lee | ..................... B60T 8/17558 |
| 10,971,003 B2* | 4/2021 | Busch | .................... G08G 1/012 |
| 2012/0083996 A1* | 4/2012 | Tas | ........................ G08G 1/0133 701/119 |
| 2014/0132425 A1* | 5/2014 | Buckel | ................... G08G 1/017 340/933 |
| 2015/0035685 A1* | 2/2015 | Strickland | .............. B60Q 1/525 340/901 |
| 2016/0004906 A1* | 1/2016 | Nerayoff | ............ G06K 9/00624 382/103 |
| 2017/0101056 A1* | 4/2017 | Park | .......................... B60R 1/00 |
| 2018/0061230 A1* | 3/2018 | Madigan | ................ G08G 1/012 |
| 2018/0096605 A1* | 4/2018 | Bai | ........................ G08G 1/161 |
| 2018/0134286 A1* | 5/2018 | Yi | ................... B60W 30/18154 |
| 2018/0162393 A1* | 6/2018 | Lee | ................... B60W 30/0956 |
| 2019/0114921 A1* | 4/2019 | Cazzoli | .................... H04W 4/40 |
| 2019/0318620 A1* | 10/2019 | Yang | ....................... G08G 1/166 |
| 2020/0105132 A1* | 4/2020 | Choi | ...................... G08G 1/0116 |
| 2020/0105137 A1* | 4/2020 | Miyakawa | ....... G08G 1/096725 |
| 2020/0105141 A1* | 4/2020 | Ikeda | .................... G08G 1/164 |
| 2020/0105142 A1* | 4/2020 | Miyakawa | ........... G08G 1/0116 |
| 2020/0242922 A1* | 7/2020 | Dulberg | ................ G08G 1/164 |
| 2020/0302784 A1* | 9/2020 | Jacobs | ....................... G06T 7/20 |
| 2021/0035438 A1* | 2/2021 | Perez Barrera | .......... G08G 1/16 |

* cited by examiner

FIG. 3A
FIG. 3B
FIG. 3C
FIG. 3D
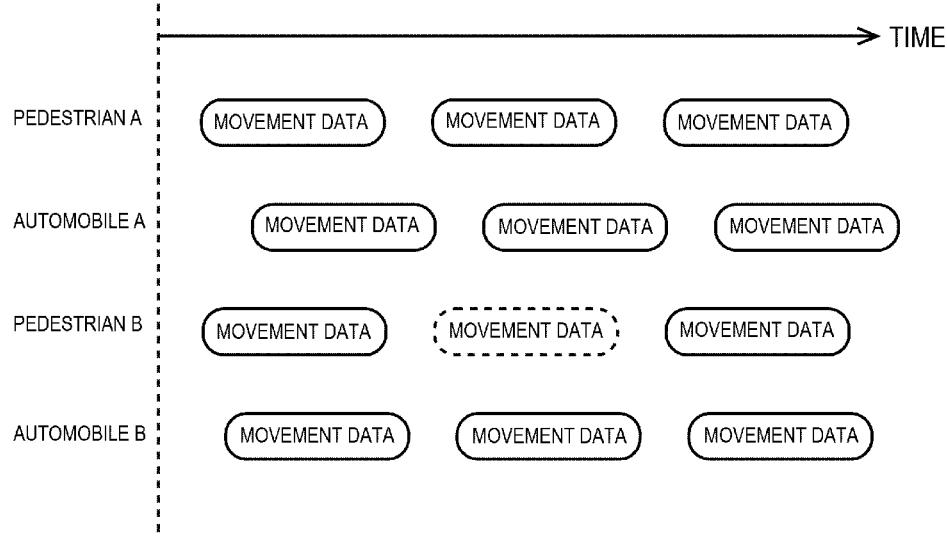
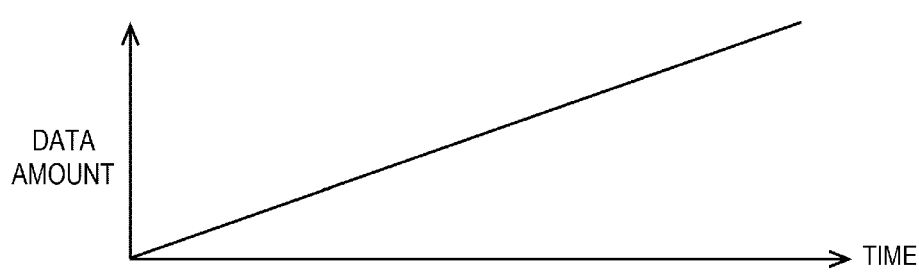
FIG. 3E

MOVABLE BODY MONITORING APPARATUS, AND VEHICLE CONTROL SYSTEM AND TRAFFIC SYSTEM USING THE MOVABLE BODY MONITORING APPARATUS

CROSS-REFERENCE TO RELATED APPLICATIONS

The present application claims priority from Japanese Patent Application No. 2018-181321 filed on Sep. 27, 2018, the entire contents of which are hereby incorporated by reference.

BACKGROUND

The disclosure relates to a movable body monitoring apparatus, and a vehicle control system and a traffic system using the same.

In recent years, as for vehicles such as automobiles on which persons get when moving, it has been considered to assist or automatically control the travel of the vehicles and the operation of devices that are used in the vehicles. Moreover, in order to improve, for example, the safety, the smoothness, the movement cost, the comfortableness, and the environmental friendliness of vehicles when moving, it is desirable to control the vehicles, not only based on information separately detected by each vehicle, but also using complex information obtained by widely acquiring and collecting information related to movements of other movable bodies such as vehicles other than the host vehicle and other pedestrians, and information on a travel environment.

Traffic systems available for this purpose include, for example, an intelligent transport system (ITS), a cooperative ITS, universal traffic management systems (UTMS), an advanced rapid transit (ART), and a public transportation priority system (PTPS), and the study and the development of these systems have been progressed. Moreover, as for the cooperative ITS, the standard TC204/WG18 is formulated.

SUMMARY

An aspect of the disclosure provides a movable body monitoring apparatus configured to receive movement data related to movements of a movable body. The movable body monitoring apparatus includes an acquiring unit, a memory, a detector, and a non-support managing unit. The acquiring unit is configured to acquire movement data on a non-support movable body incapable of transmitting and receiving movement data to and from a host vehicle, from a support movable body capable of transmitting and receiving the movement data to and from the host vehicle. The memory is configured to store and record therein the movement data acquired by the acquiring unit. The detector is configured to detect passing of a movable body from the host vehicle. The non-support managing unit is configured to manage the movement data on the non-support movable body recorded in the memory. The non-support managing unit is configured to, when it is determined that the non-support movable body the movement data on which has been recorded in the memory has passed by on a basis of detection data by the detection of the detector, invalidate or delete the movement data on the non-support movable body from the memory on a movable-body by movable-body basis.

An aspect of the disclosure provides a movable body monitoring apparatus configured to receive movement data related to movements of a movable body. The movable body monitoring apparatus includes a transmitter, a receiver, a detector, and a determining unit. The transmitter is configured to transmit movement data on a non-support movable body travelling ahead of a host vehicle and incapable of transmitting and receiving the movement data. The receiver is configured to receive, from another movable body having received the movement data on the non-support movable body, detection data indicating that passing of a movable body has been detected. The detector is configured to detect another movable body travelling ahead of the host vehicle. The determining unit is configured to compare the received detection data with detection data by the detector, and determine whether the other movable body the passing of which has been detected is the non-support movable body. The transmitter is configured to transmit a determination result as to whether the other movable body the passing of which has been detected is the non-support movable body.

An aspect of the disclosure provides a vehicle control system including any of the movable body monitoring apparatuses described above, and a vehicle control apparatus configured to control a vehicle on a basis of monitoring by the movable body monitoring apparatus.

An aspect of the disclosure provides a traffic system including any of the movable body monitoring apparatuses described above, and a server apparatus configured to transmit and receive the movement data related to the movements of the movable bodies to and from the movable body monitoring apparatus.

An aspect of the disclosure provides a movable body monitoring apparatus configured to receive movement data related to movements of a movable body. The movable body monitoring apparatus includes circuitry. The circuitry is configured to acquire movement data on a non-support movable body incapable of transmitting and receiving movement data to and from a host vehicle, from a support movable body capable of transmitting and receiving the movement data to and from the host vehicle. The circuitry is configured to store and record therein the acquired movement data. The circuitry is configured to detect passing of a movable body from the host vehicle. The circuitry is configured to manage the recorded movement data on the non-support movable body. The circuitry is configured to, when it is determined that the non-support movable body the movement data on which has been recorded has passed by on a basis of detection data by the detection, invalidate or delete the movement data on the non-support movable body on a movable-body by movable-body basis.

An aspect of the disclosure provides a movable body monitoring apparatus configured to receive movement data related to movements of a movable body. The movable body monitoring apparatus includes circuitry. The circuitry is configured to transmit movement data on a non-support movable body travelling ahead of a host vehicle and incapable of transmitting and receiving the movement data. The circuitry is configured to receive, from another movable body having received the movement data on the non-support movable body, detection data indicating that passing of a movable body has been detected. The circuitry is configured to detect another movable body travelling ahead of the host vehicle. The circuitry is configured to compare the received detection data with detection data by the detector, and determine whether the other movable body the passing of which has been detected is the non-support movable body. The circuitry is configured to transmit a determination result as to whether the other movable body the passing of which has been detected is the non-support movable body.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 3A to FIG. 3E are explanatory diagrams illustrating a correspondence relationship between generation status of movement data related to the movements of the plurality of movable bodies and the amount of data stored in a memory.

DETAILED DESCRIPTION

Figure 1:
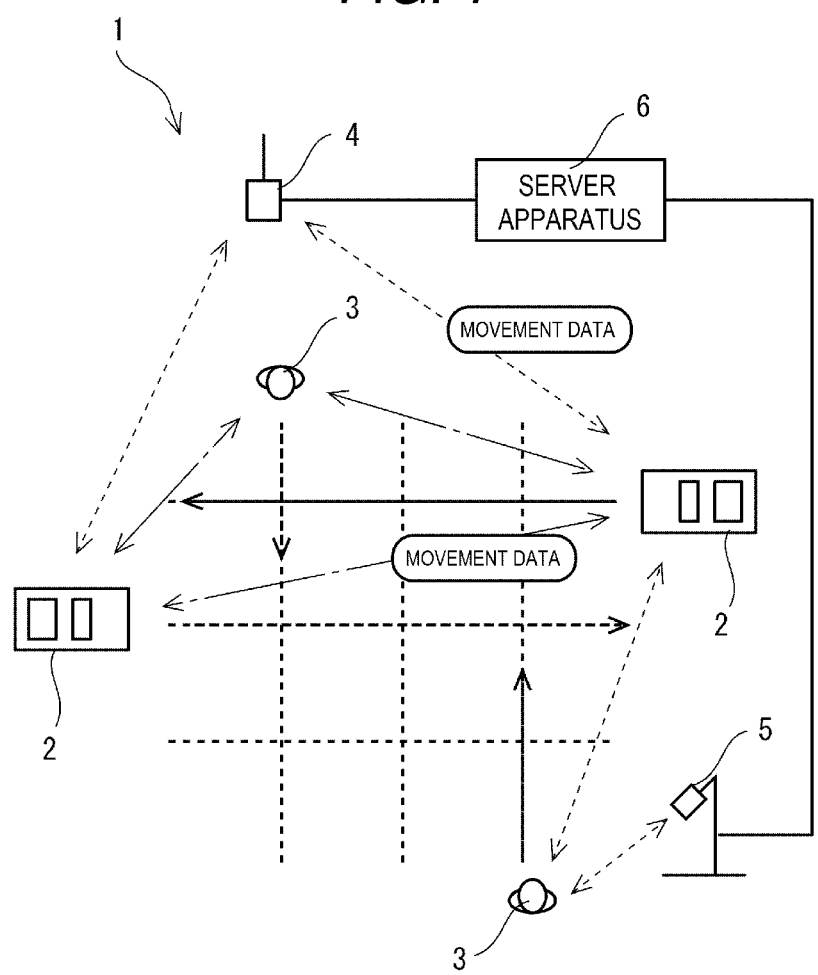
FIG. 1 is a schematic explanatory diagram illustrating an example of a traffic system according to an embodiment of the disclosure.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. Consider a situation in which information on movable bodies and the like can be actually transmitted and received. In this case, vehicles such as automobiles that collect and process the information are requested to acquire data on a large amount of information and to use the data for control of the vehicles.

However, vehicles of related art such as automobiles have received and processed, not movement data on individual movable bodies, but (i) congestion data into which the movement data are collectively abstracted and (ii) partial map data for guiding a path, only in an area including the host vehicle position.

Even if a technology enables the vehicles of the related art such as automobiles to widely collect information on movable bodies, the vehicles are not configured to appropriately acquire movement data on a large number of movable bodies widely collected or control the travel of the vehicles based on the acquired movement data.

Japanese Unexamined Patent Application Publication (JP-A) No. 2012-12493 discloses a technique of grouping and managing a plurality of movable bodies, as a technique under study and development. This technique is considered to reduce a monitoring load, compared with a case in which a plurality of movable bodies are individually monitored.

However, when a plurality of movable bodies are grouped and managed, those movable bodies need to support the technique of grouping.

Meanwhile, in the real world, a movable body that does not support the technique of grouping of JP-A No. 2012-12493 is present. When such a non-support movable body is present, if the technique of grouping of JP-A No. 2012-12493 can be employed in the real world, it is expected that monitoring the non-support movable body and controlling the travel and the like of a vehicle corresponding to the non-support movable body cannot be conducted appropriately.

Therefore, it is desired in vehicles such as automobiles that movement data on a plurality of movable bodies including movement data on a movable bodies that do not support the traffic system 1 are excellently acquired.

Moreover, it is considered that vehicles such as automobiles that intend to support such a traffic system are each required to acquire a large amount of movement data from the traffic system and use the large amount of movement data for the control of the vehicle.

However, when a large amount of movement data is acquired and used for the control of each vehicle, the processing of the large amount of movement data causes not only the shortage of the memory, but also there is a possibility that the vehicle can never move forward or the movement of the vehicle is unnecessarily and excessively reactive.

First Embodiment

FIG. 1 is a schematic explanatory diagram illustrating an example of a traffic system 1 according to an embodiment of the disclosure.

FIG. 1 illustrates a plurality of vehicles 2 serving as a plurality of movable bodies, and a plurality of pedestrians 3 serving as low-speed movable bodies. In the vehicles 2 such as automobiles on which persons get when moving, assisting or automatically controlling the travel of the vehicles 2 and the operation of devices that are used in the vehicles 2 have become available. In addition to an automobile or an electric vehicle on which a plurality of persons can get, examples of the vehicles 2 include a motor cycle, a personal mobility aid, a cart, and an electric wheelchair.

The traffic system 1 in FIG. 1 includes a plurality of vehicular communication devices, a plurality of pedestrian communication devices, a base station 4, a beacon apparatus 5, and a server apparatus 6. The plurality of vehicular communication devices are respectively provided to the vehicles 2 such as automobiles. The plurality of pedestrian communication devices are respectively carried by the low-speed movable bodies such as the pedestrians 3. FIG. 1 illustrates the vehicles 2 in place of the vehicular communication devices and the pedestrians 3 in place of the pedestrian communication device. The traffic system 1 may use a base station of a commercial wireless communication and a communication device that is disposed on a road shoulder of a highway, as the base station 4.

In the traffic system 1 in FIG. 1, the communication device of each of the vehicles 2 and the pedestrians 3 transmits movement data related to a movement itself as a movable body to the server apparatus 6 via the base station 4 or the beacon apparatus 5. The server apparatus 6 collects the movement data related to the movements of the plurality of movable bodies, generates data on traffic information as necessary based on the collected movement data, and transmits the movement data and the data on the traffic information to the communication devices. The server apparatus 6 transmits and receives the movement data related to the movements of the movable bodies, to and from the vehicular communication devices.

In the traffic system 1 in FIG. 1, the communication device of each of the vehicles 2 and the pedestrians 3 transmits the movement data related to the movement itself as a movable body to another communication device that is in the vicinity thereof.

Upon receipt of the movement data and the like from the server apparatus 6 or a communication device of another movable body, each communication device stores and uses the movement data and the like for control of the movement itself.

For example, in FIG. 1, the right-hand vehicle 2 travels straight leftward. The left-hand vehicle 2 in FIG. 1 travels straight rightward. The right-hand vehicle 2 and the left-hand vehicle 2 in FIG. 1 pass each other on a bidirectional road, for example.

The lower-right-hand pedestrian 3 in FIG. 1 travels straight upward. Before the lower-right-hand pedestrian 3 with a low movement speed reaches an intersecting position of courses of the right-hand vehicle 2 and the left-hand vehicle 2 in FIG. 1, the right-hand vehicle 2 and the left-hand vehicle 2 have passed the intersecting position.

In contrast, the upper-left-hand pedestrian 3 in FIG. 1 travels straight downward. Accordingly, there is a possibility that before and after the timing when the upper-left-hand pedestrian 3 reaches an intersecting position, the right-hand vehicle 2 in FIG. 1 may reach the intersecting position.

In this case, the vehicular communication device mounted on the right-hand vehicle 2 in FIG. 1 accelerates or decelerates the movement speed of the host vehicle so that the right-hand vehicle 2 does not pass through the intersecting position simultaneously with the upper-left-hand pedestrian 3, based on pre-received movement data related to the movement of the upper-left-hand pedestrian 3.

It is expected that the traffic system 1 transmits and receives movement data related to movements of a plurality of movable bodies to and from the plurality of movable bodies to allow the plurality of movable bodies to move in safety.

For example, the vehicle 2 can control the vehicle 2 not only based on information detected by the vehicle 2 itself, but also using complex information obtained by widely acquiring and collecting (i) information related to movements of other movable bodies, such as other vehicles than the host vehicle, and other pedestrians 3, and (ii) information on an travel environment.

Transmitting and receiving the movement data among the plurality of movable bodies using the traffic system 1 in this manner can improve the safety, the smoothness, the movement cost, the comfortableness, and the environmental friendliness of the movements of the movable bodies.

The traffic system 1 available for such a case includes, for example, an intelligent transport system (ITS), a cooperative ITS, universal traffic management systems (UTMS), an advanced rapid transit (ART), and a public transportation priority system (PTPS). The cooperative ITS is standardized by the standard TC204/WG18.

Figure 2:
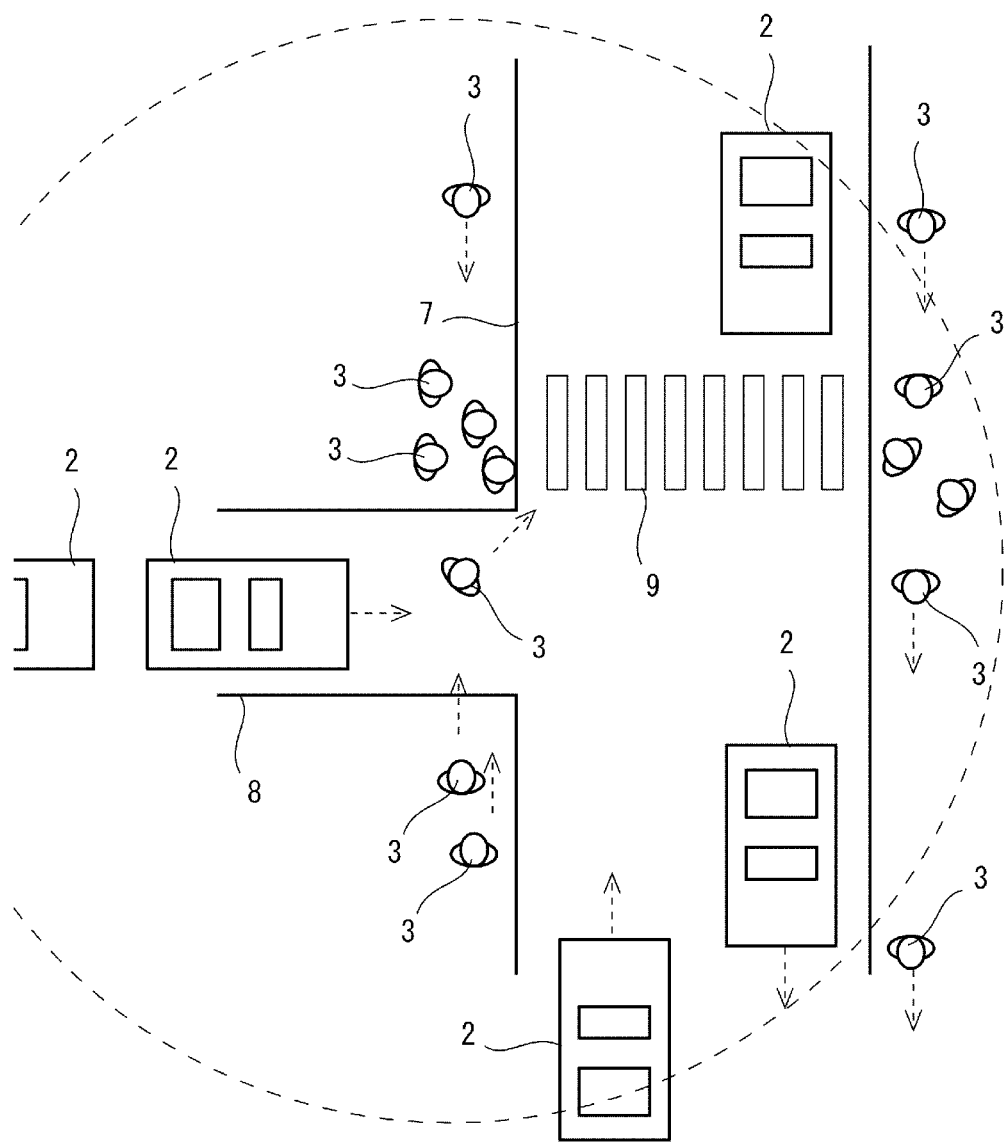
FIG. 2 is an explanatory diagram illustrating an example in which vehicles and pedestrians are moving as a plurality of movable bodies.

FIG. 2 is an explanatory diagram illustrating an example in which the vehicles 2 and the pedestrians 3 are moving as a plurality of movable bodies.

FIG. 2 illustrates a main road 7 that extends in the vertical direction, and an alley 8 that extends in the left direction from the main road 7. The vehicles 2 such as automobiles move on central portions of the main road 7 and the alley 8. The pedestrians 3 move on side portions of the main road 7 and the alley 8. Moreover, the pedestrians 3 stop before a pedestrian crossing 9 on a red traffic signal, and cross the main road 7 on the pedestrian crossing 9 when the traffic signal turns to green. FIG. 2 illustrates a large number of the pedestrians 3 and a large number of the vehicles 2.

In order to achieve the above-mentioned object of the traffic system 1, the vehicle 2 that travels on the main road 7 from the lower part to the upper part in FIG. 2 in such a travel environment, for example, is cautious about not only another vehicle 2 such as an oncoming vehicle that travels on the same main road 7, but also a large number of pedestrians 3 that walk on the road side stripe near the vehicle 2, and the pedestrian 3 and the vehicle 2 that appear from the alley 8, and travels by finely adjusting a course thereof so as not to come into contact, such as collision, with these.

Accordingly, the vehicle 2 is to instantaneously acquire movement data having information, such as the positions and the speed of a large number of other movable bodies that are present in the surrounding thereof. This enables the vehicle 2, when passing by another movable body, to adjust the course so as not to come into contact with the other movable body.

Each movable body is to continuously acquire the latest movement data on a large number of other movable bodies that are present in the surrounding of the movable body itself. For example, the vehicle 2 that is located at the head on the alley 8 is to continuously acquire the latest movement data on a large number of other movable bodies that are in an area surrounded by a circular dashed line.

Moreover, each movable body is unable to limit the number of other movable bodies that are present in the surrounding thereof by the movable body itself.

FIG. 3A to FIG. 3E are explanatory diagrams illustrating a correspondence relationship between generation status of movement data related to the movements of the plurality of movable bodies and the amount of data stored in a memory.

FIG. 3A illustrates plural pieces of movement data on a pedestrian A.

FIG. 3B illustrates plural pieces of movement data on a vehicle A.

FIG. 3C illustrates plural pieces of movement data on a pedestrian B.

FIG. 3D illustrates plural pieces of movement data on a vehicle B.

In FIG. 3A to FIG. 3D, the plural pieces of movement data are generated in order from the left side to the right side.

FIG. 3E illustrates a time change graph illustrating the total data amount of the movement data from FIG. 3A to FIG. 3D.

As illustrated in the graph in FIG. 3E, the total data amount of the movement data proportionally increases in accordance with the elapse of time. Moreover, the increase ratio of the total data amount becomes larger as the number of movable bodies increases more.

In order to achieve the object of the traffic system 1, as illustrated in FIG. 3A to FIG. 3D, each movable body repeatedly transmits movement data having information, such as the latest position and speed thereof, at as short intervals as possible.

As a result, as illustrated in FIG. 3E, the total data amount of the movement data that are transmitted and received among the plurality of movable bodies dramatically increases in accordance with the number of movable bodies to be collected and the elapsed time from when the collection is started. The amount of data stored in the memory by each movable body in order to monitor the movements of the other movable bodies also increases in the same tendency.

As in the foregoing, in order to achieve the object of the traffic system 1, the communication device in each movable body that is provided to the vehicle 2 or the like and acquires and collects the movement data is to appropriately collect such a large number of movement data and use the large number of movement data for control of a movement thereof.

The vehicle 2 such as an automobile has no experience of having treated such a large number of data.

However, a vehicle 2 of related art such as an automobile simply has a data processing ability of processing data detected by the host vehicle, and receiving and processing static congestion data into which movements of individual movable bodies are collectively abstracted and partial map data for guiding a path, only in an area including the host vehicle position.

In other words, even if a technology enables current vehicles to widely collect information on movable bodies, the current vehicles cannot appropriately acquire widely collected dynamic movement data on a large number of the movable bodies and control the travel and the like of the vehicles based on the acquired dynamic movement data.

Therefore, the movable bodies such as automobiles are required to support the traffic system 1, as a measure in the future.

Conversely, even if at least any traffic system 1 is employed in the present, in the actual scene, a movable body that does not support the technique of the traffic system 1 is present.

Accordingly, if the traffic system 1 is not one capable of supporting a non-support movable body such as a vehicle that does not support the traffic system 1, it is difficult to use the traffic system 1 in the actual scene.

Moreover, it is considered that the vehicle 2 such as an automobile that is intended to support such the traffic system 1 is required to acquire a large amount of movement data from the traffic system 1 and use the large amount of movement data for the control of the vehicle.

However, when a large amount of movement data is acquired and used for the control of the vehicle 2, the processing of the large amount of movement data causes not only the shortage of the memory, but also there is a possibility that the vehicle 2 can never move forward or the movement of the vehicle 2 is unnecessarily and excessively reactive.

Hereinafter, measures taken in the embodiments of the disclosure will be described.

Figure 4:
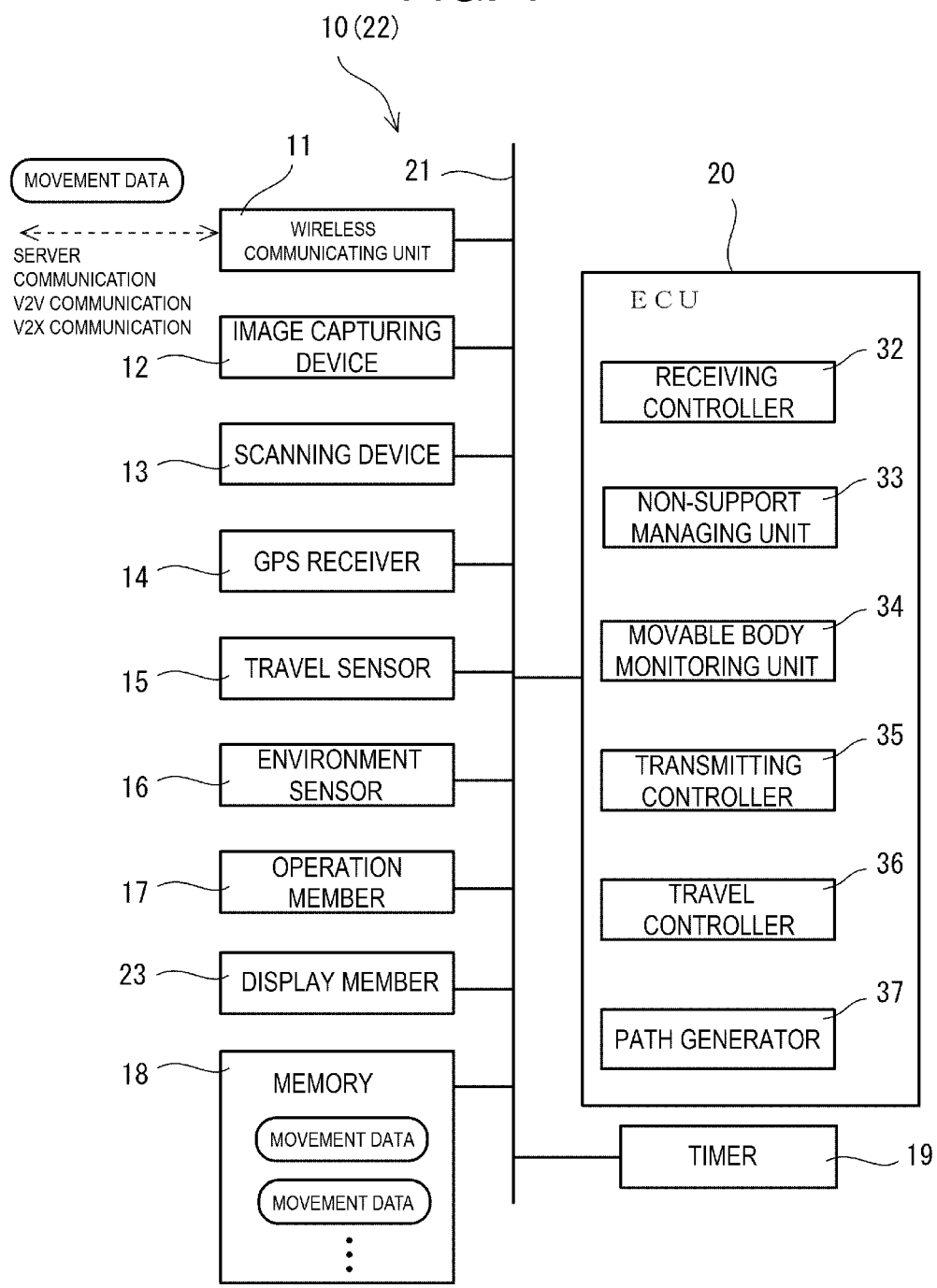
FIG. 4 is an explanatory diagram illustrating an example of a vehicle control system that is provided with a vehicular communication device according to the embodiment of the disclosure.

FIG. 4 is an explanatory diagram illustrating an example of a vehicle control system 10 that is provided with a vehicular communication device according to the embodiment of the disclosure.

The vehicle control system 10 in FIG. 4 is provided to the vehicle 2 as a movable body, and controls the travel and the like of the vehicle 2.

The vehicle control system 10 in FIG. 4 includes a wireless communicating unit 11, an image capturing device 12, a scanning device 13, a GPS receiver 14, a travel sensor 15, an environment sensor 16, an operation member 17, a display member 23, the memory 18, a timer 19, an electronic control unit (ECU) 20, and an in-vehicle network 21 that couples these units. A one-chip microcomputer may include the memory 18, the timer 19, and the like, in addition to the ECU 20. This one-chip microcomputer may be coupled to the in-vehicle network 21.

In FIG. 4, a vehicular communication devices 22 may be configured with, for example, the wireless communicating unit 11, the memory 18, the timer 19, and the ECU 20.

The in-vehicle network 21 is a network that couples devices that are provided to the respective units of the vehicle 2, in the vehicle 2 such as an automobile. The in-vehicle network 21 may be a controller area network (CAN), a local interconnect network (LIN), or Ethernet, for example. Moreover, the in-vehicle network 21 may include a relay device, and a plurality of communication cables that are coupled to the relay device. In this case, the devices that are provided to the respective units of the vehicle 2 may be distributed and coupled to the plurality of communication cables. The devices that are provided to the respective units of the vehicle 2 transmit and receive data to and from other devices via the in-vehicle network 21.

The image capturing device 12 captures an image of an inside or a surrounding of the vehicle 2. The vehicle 2 that supports the traffic system 1 may be provided with the image capturing device 12 that captures at least an image ahead of the vehicle 2. In this case, the vehicle 2 acquires a captured image of another vehicle or the like that is travelling ahead of the vehicle 2.

The scanning device 13 scans another movable body and a fixed installed object that are present in the surrounding of the vehicle 2, by a radar or the like. This enables the vehicle 2 to detect distances or the like to the other movable body and the fixed installed object that are present in the surrounding of the vehicle 2.

The GPS receiver 14 receives radio waves from a GPS satellite, and generates current position information on the vehicle 2. The GPS receiver 14 may receive radio waves from the base station 4 and a radio tower that are fixedly disposed on the ground, and generate or correct the current position information on the vehicle 2. The vehicle 2 may generate the current position information on the vehicle 2 based on radio waves from the base station 4 that are received by the wireless communicating unit 11, for example, different from the GPS receiver 14, or based on detection about the travel of the vehicle 2.

The travel sensor 15 detects information related to actual travel of the vehicle 2. The information related to the actual travel of the vehicle 2 includes, for example, a speed and a movement direction of the vehicle 2. The information related to the actual travel of the vehicle 2 may further include, for example, an operating state of a drive source, an operating state of a transmission, an operating state of a braking device, and a steering state of the vehicle 2.

The environment sensor 16 detects an actual environment at a position where the vehicle 2 is present. Information on the actual environment includes, for example, a state of sunshine, a state of rain, a type of road surface, the temperature, and the humidity.

The operation member 17 is a member with which an occupant riding on the vehicle 2 operates the travel and the like of the vehicle 2. The operation member 17 includes, for example, a steering wheel, an accelerator pedal, a brake pedal, a shift lever, a wiper switch, a turn signal lever, a start button, and an operation mode switching button. When the occupant operates the operation member 17, the operation member 17 generates information on the operation, and outputs the information.

The display member 23 is a member that displays information by means of an image with respect to an occupant riding in the vehicle 2. The display member 23 may be a liquid crystal monitor or a head-up display (HUD), for example. The display member 23 may operate in corporation with the operation member 17 to constitute a user interface.

When display data is updated, the display member 23 displays a screen showing the updated display data thereon.

The timer 19 measures a time duration or a time, and outputs the time duration or the time.

The wireless communicating unit 11 may simply transmit and receive communication data of the traffic system 1. The wireless communicating unit 11 performs communication with the base station 4 and the beacon apparatus 5, for example, which are used in the traffic system 1, and performs vehicle-to-vehicle (V2V) communication or V2X communication with the communication devices, which are used in the other movable bodies. The wireless communicating unit 11 may perform communication with one base station 4 or one beacon apparatus 5 that performs communication in a zone designated by the traffic system 1. In this case, when the vehicle 2 moves over the zone, the traffic system 1 designates one base station 4 or one beacon apparatus 5 that corresponds to a new zone as a destination of a wireless data communication. This enables the wireless communicating unit 11 to transmit and receive the movement data or the like to and from the server apparatus 6 of the traffic system 1 even when the movable body is moving.

Herein, the movement data includes, for example, identification information, attribute information, position information, position detection time information, speed information, and travel direction information on a movable body. The movement data may include, in addition to these, for example, time information corresponding to a generation timing of the movement data, and the like.

The identification information on a movable body may be information for identifying the movable body from other different movable bodies. The identification information on a movable body may be an identification number unique to the movable body, for example. As for the identification number on a movable body, for example, a vehicle body number and a serial number that are assigned to the vehicle 2, a MAC address and an IP address that are assigned to the wireless communicating unit 11, and the like may be used.

The attribute information on a movable body is information indicating the type of the movable body. The types of the movable body include, for example, an automobile, the vehicle 2, the pedestrian 3, a bicycle, a dog, a child, and an elderly person. When the movable body is the vehicle 2, the attribute information may include, for example, information on a manufacturer of the vehicle body, a vehicle type, a model number, a color number, an image of appearance, an exterior option to be made, the type of tires, the type of wheels, a vehicle body number, and the like.

The position information on a movable body may be position information generated by the GPS receiver 14, for example.

The position detection time information on a movable body may be a measurement time by the timer 19 at timing when the GPS receiver 14 receives GPS radio waves, and a measurement time by the timer 19 at timing when the GPS receiver 14 generates position information, for example.

The speed information on a movable body may be an actual speed of the movable body detected by the travel sensor 15, for example.

The travel direction information on a movable body may be an actual movement direction of the movable body detected by the travel sensor 15, for example.

The movement data may include a part of these information. The plurality of movable bodies in the traffic system 1 may transmit and receive movement data including different information.

The memory 18 records therein (i) various types of programs that are used in the vehicle 2 and (ii) various data that is used during the execution of the programs. The data to be recorded in the memory 18 includes data acquired in the above-mentioned respective units of the vehicle 2. The movement data received by the wireless communicating unit 11 is stored and recorded in the memory 18, for example.

The ECU 20 reads and executes the program recorded in the memory 18. This implements a controller of the vehicle 2. The controller of the vehicle 2 controls the above-mentioned respective units of the vehicle 2.

FIG. 4 illustrates, as functions of the controller of the vehicle 2 that are implemented by the ECU 20, a receiving controller 32, a non-support managing unit 33, a movable body monitoring unit 34, a transmitting controller 35, a travel controller 36, and a path generator 37.

The receiving controller 32 acquires reception data on another movable body from the wireless communicating unit 11 and processes the reception data on the other movable body. When the reception data is movement data on another movable body, for example, the receiving controller 32 records the acquired movement data on the other movable body in the memory 18. This stores and records plural pieces of the acquired movement data in the memory 18.

When a plurality of other movable bodies stored and recorded in the memory 18 include a non-support vehicle 2 that does not support the traffic system 1, the non-support managing unit 33 manages movement data on the non-support vehicle 2.

For example, the non-support managing unit 33 captures an image of another vehicle 2 travelling ahead of the host vehicle using the image capturing device 12 or the like. Then, the non-support managing unit 33 determines whether the other vehicle 2 is the non-support vehicle 2 that does not support the traffic system 1, using the movement data in the memory 18. When the other vehicle 2 is the non-support vehicle 2 that does not support the traffic system 1, the non-support managing unit 33 generates movement data on the non-support vehicle 2 travelling ahead of the host vehicle, and stores the movement data in the memory 18. The transmitting controller 35 transmits the movement data on the non-support vehicle 2 stored in the memory 18 to another movable body, together with other movement data.

Moreover, when receiving the movement data on the non-support vehicle 2, the non-support managing unit 33 detects the passing of the non-support vehicle 2 the movement data on which has been stored in the memory 18 using the image capturing device 12 or the like from the host vehicle after the reception, and deletes or invalidates the movement data on the non-support vehicle 2 from the memory 18 on a non-support vehicle 2 by non-support vehicle 2 basis.

Moreover, when receiving a correspondence determination request of the non-support vehicle 2 from another movable body, the non-support managing unit 33 may determine a correspondence, and transmit the determination result as a response.

The movable body monitoring unit 34 monitors movements of a plurality of other movable bodies, based on the information on the plurality of other movable bodies stored and recorded in the memory 18. The movable body monitoring unit 34 monitors an influence on the course (travel) of the host vehicle, caused by the movement of another movable body, for example.

The movable body monitoring unit 34 predicts courses of the other movable bodies that are present within a monitoring area including the host vehicle and the course, for example, and sets a monitoring level for each of the other movable bodies based on a determination as to an intersection with the course of the host vehicle.

The monitoring level for each of the other movable bodies may be classified into, for example, a high level when the course of another movable body intersects with the course of the host vehicle, a middle level when the course of another movable body approaches the course of the host vehicle, and a low level when the course of another movable body is distant from the course of the host vehicle.

The transmitting controller 35 causes the wireless communicating unit 11 to transmit part or all of the movement data on the plurality of other movable bodies that are stored and recorded in the memory 18.

The path generator 37 generates a movement path along which a movable body moves to a destination, and records information on the generated movement path in the memory 18.

The travel controller 36 controls the travel of the vehicle 2 by self-driving or driving assist. The travel controller 36 adjusts the course of the vehicle 2 in accordance with the operation of the operation member 17 by the occupant, the movement path recorded in the memory 18, the movement data on the plurality of other movable bodies recorded in the memory 18, the monitoring result by the movable body monitoring unit 34, and the like, and controls the travel of the vehicle 2, for example.

For example, the travel controller 36 determines a short-term course based on the amount of operation of the operation member 17 and the movement path, and adjusts the course of the vehicle 2 so as to prevent the short-term course from intersecting with or approaching a course of another movable body. Moreover, the travel controller 36 controls the travel of the vehicle 2 so as to cause the vehicle 2 to move along the generated course.

Figure 5:
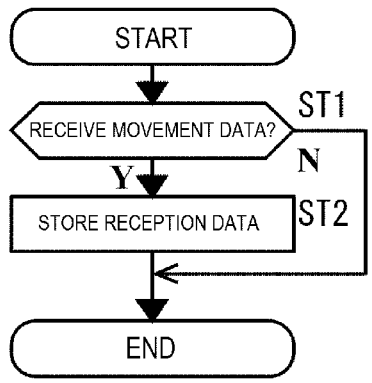
FIG. 5 is an explanatory diagram illustrating an example of processing of a receiving controller in FIG. 4.

FIG. 5 is an explanatory diagram illustrating an example of processing of the receiving controller 32 in FIG. 4.

For example, when the wireless communicating unit 11 receives new movement data, the receiving controller 32 may conduct reception processing in FIG. 5 repeatedly or at periodic timing.

At a step ST1 in the reception processing in FIG. 5, the receiving controller 32 determines whether the wireless communicating unit 11 has received movement data.

It is assumed that the receiving controller 32 has received not only movement data on a movable body that supports the traffic system 1 but also has received movement data on a movable body that does not support the traffic system 1.

If the wireless communicating unit 11 has not received movement data, the receiving controller 32 ends the reception processing in FIG. 5.

If the wireless communicating unit 11 has received movement data, the receiving controller 32 acquires and stores the movement data in the memory 18, at a step ST2. Thereafter, the receiving controller 32 ends the reception processing in FIG. 5.

The processing in the foregoing is repeated to store plural pieces of movement data on the respective other movable bodies at different times acquired by the receiving controller 32, in the memory 18.

The receiving controller 32 acquires, from the wireless communicating unit 11, together with movement data on the vehicle 2 that supports the traffic system 1, for example, movement data on the non-support vehicle 2 travelling ahead of the vehicle 2, and stores the movement data in the memory 18.

When storing new movement data in the memory 18, the receiving controller 32 may delete old and unnecessary data in the memory 18. This prevents the amount of data stored in the memory 18 from continuously increasing with time. It is possible to appropriately store the movement data on a plurality of other movable bodies using the memory 18 having a limited storage capacity.

Figure 6:
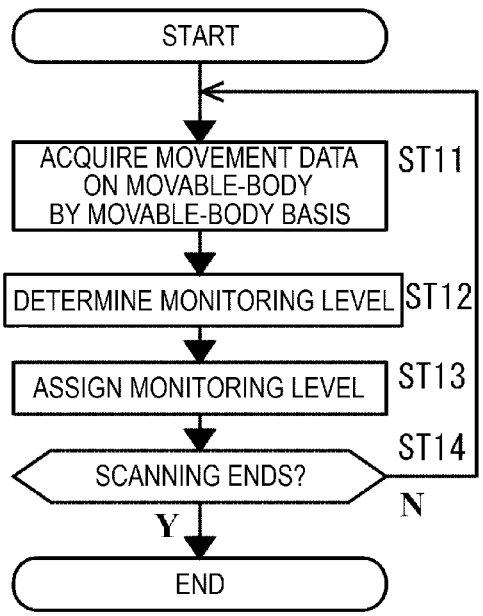
FIG. 6 is an explanatory diagram illustrating an example of processing of a movable body monitoring unit in FIG. 4.

FIG. 6 is an explanatory diagram illustrating an example of processing of the movable body monitoring unit 34 in FIG. 4.

The movable body monitoring unit 34 may repeatedly conduct monitoring processing in FIG. 6, for example, (i) when a series of movement control by the travel controller 36 has been completed one time, (ii) when new movement data on the host vehicle has been recorded in the memory 18, or (iii) at periodic timing.

At a step ST11 of the monitoring processing in FIG. 6, as for plural pieces of movement data recorded in the memory 18, the movable body monitoring unit 34 acquires the movement data on a movable-body by movable-body basis. When plural pieces of movement data on each movable body at different times have been stored in the memory 18, the movable body monitoring unit 34 acquires the plural pieces of movement data.

At a step ST12, the movable body monitoring unit 34 predicts and determines, using the acquired movement data, (i) whether the movement of another movable body corresponding to the movement data influences the movement of the host vehicle and (ii) a degree of influence, and determines the monitoring level in accordance with the result of the prediction determination.

For example, when the movable body monitoring unit 34 has acquired movement data on a group, the movable body monitoring unit 34 moves a position of a multiple-order curve at the highest movement speed in a lane direction among a plurality of low-speed movable bodies belonging to the group. The movable body monitoring unit 34 then determines whether there is a possibility that another movable body intersects with or approaches the course of the host vehicle.

In addition to this, for example, when the movable body monitoring unit 34 has acquired individual movement data on other movable bodies, the movable body monitoring unit 34 predicts a course of the other movable body based on movement data, and determines whether there is a possibility that the other movable body intersects with or approaches the course of the host vehicle. Moreover, the movable body monitoring unit 34 may calculate an arrival time of the other movable body to the intersecting position or the approaching position and an arrival time of the host vehicle to the intersecting position or the approaching position, and may determine whether there is a possibility that the other movable body intersects with or approaches the course of the host vehicle by considering a time difference therebetween.

The movable body monitoring unit 34 uses all the movement data stored in the memory 18 to determine the movement of the other movable bodies with high accuracy.

At a step ST13, the movable body monitoring unit 34 assigns a monitoring level to the other movable body based on (i) whether the movement of the other movable body influences the movement of the host vehicle and (ii) the degree of influence.

The monitoring level to be assigned to the other movable body may be, for example, a high level when the course of the other movable body intersects with the course of the host vehicle, a middle level when the course of the other movable body approaches the course of the host vehicle, and a low level when the course of the other movable body neither intersects with nor approaches the course of the host vehicle.

Repeating the processing in the foregoing enables the movable body monitoring unit 34 to continuously monitor another movable body in accordance with an every-changing movement situation of the other movable body. Moreover, the movable body monitoring unit 34 may classify a plurality of other movable bodies according to the monitoring levels.

Figure 7:
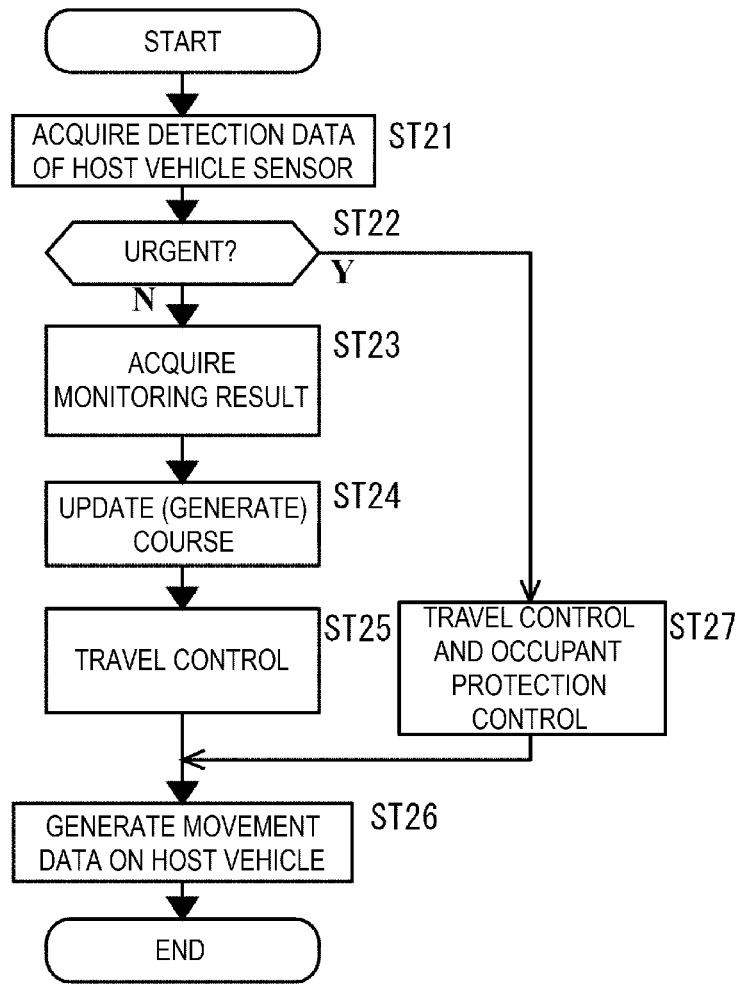
FIG. 7 is an explanatory diagram illustrating an example of processing of a travel controller serving as a vehicle control apparatus in FIG. 4.

FIG. 7 is an explanatory diagram illustrating an example of processing of the travel controller 36 serving as a vehicle control apparatus in FIG. 4.

The travel controller 36 may repeatedly conduct travelling processing in FIG. 7, for example, (i) when a previous-time series of the movement control by the travel controller 36 has completed, (ii) when new movement data on the host vehicle has been recorded in the memory 18 or (iii) at periodic timing.

At a step ST21 of the travel processing in FIG. 7, the travel controller 36 acquires detection data and the like of various host vehicle sensors that are provided to the vehicle 2.

At a step ST22, the travel controller 36 determines whether a travel state of the host vehicle is an urgent state based on the detection data of the host vehicle sensors. For example, when detecting running out of the pedestrian 3 or another vehicle into a roadway in an image ahead of the vehicle 2 captured by the image capturing device 12, the travel controller 36 determines that the travel state of the host vehicle is the urgent state.

If the travel state of the host vehicle is the urgent state, the travel controller 36 causes the processing to proceed to a step ST27. At the step ST27, the travel controller 36 executes travel control of the vehicle 2 to deal with the urgent situation, and occupant protection control. The travel controller 36 executes, for example, avoid control to instantly brake the vehicle 2 to be stopped suddenly. Moreover, when the travel sensor 15 detects the high acceleration after having started the control of the sudden stop, the travel controller 36 executes the occupant protection control using a seatbelt and an airbag. In the urgent travel control, the travel controller 36 may transmit movement data on the host vehicle indicating the urgency from the wireless communicating unit 11 to other movable bodies. This enables the other movable bodies to start necessary urgent travel control following the urgent travel control of the host vehicle. The travel controller 36 of the host vehicle may also determine whether the wireless communicating unit 11 has received movement data indicating the urgency from another movable body at the step ST22. If the wireless communicating unit 11 has received such movement data, the travel controller 36 may cause the processing to proceed to the step ST27.

Thereafter, the travel controller 36 causes the processing to proceed to a step ST26.

If the travel state of the host vehicle is not the urgent state, the travel controller 36 causes the processing to proceed to a step ST23. At the step ST23, the travel controller 36 acquires the monitoring result by the movable body monitoring unit 34.

At a step ST24, the travel controller 36 generates or adjusts a course of the vehicle 2 in accordance with the monitoring results about the movements of the plurality of movable bodies by the movable body monitoring unit 34, and updates the course.

The travel controller 36 generates a course during a movement control period this time of the vehicle 2, for example, based on the movement path generated by the path generator 37. For example, the travel controller 36 generates a course in which the vehicle travels on a present lane without any change when the vehicle travels straight. The travel controller 36 generates a course in which the vehicle changes the lane for right or left turning and travels when the vehicles turns right or left.

Moreover, the travel controller 36 determines, based on the monitoring result, whether there is another movable body having a possibility of intersecting with or approaching the course that is used for the movement control this time of the vehicle 2 during the movement control period this time of the vehicle 2. The travel controller 36 predicts a moving speed and a moving direction of a movable body having a high-level or middle-level monitoring result during the movement control period this time of the vehicle 2, and determines whether the movable body intersects with or approaches the course of the host vehicle.

When there is no movable body that intersects with or approaches the course of the host vehicle during the movement control period this time of the vehicle 2, the travel controller 36 adopts the course generated based on the movement path as a course to be used for the control this time and updates the course.

When there is another movable body that intersects with or approaches the course of the host vehicle during the movement control period this time of the vehicle 2, the travel controller 36 updates the course so as to cause the course generated based on the movement path to be apart from the course of the other movable body. Alternatively, the travel controller 36 updates speed information on the course generated based on the movement path so as to allow the vehicle to stop before the intersecting position or the approaching position.

At a step ST25, the travel controller 36 controls the travel of the host vehicle, in accordance with the updated new course, by the control within a range in which the vehicle 2 travels in safety. When the occupant operates the operation member 17 during the control, the travel controller 36 may adjust the course by increasing or decreasing an amount of control relative to an amount of the operation to be close to the updated new course.

At a step ST26, the travel controller 36 generates movement data on the host vehicle including new position information and new time information on the host vehicle after the control, and stores the movement data in the memory 18.

Repeating the processing in the foregoing enables the travel controller 36 to continuously control the movement of the host vehicle in accordance with an every-changing movement situation of another movable body.

Next, processing related to a non-support vehicle in cooperation among the non-support managing units 33 of movable bodies such as a plurality of the vehicles 2 will be described.

Figure 8:
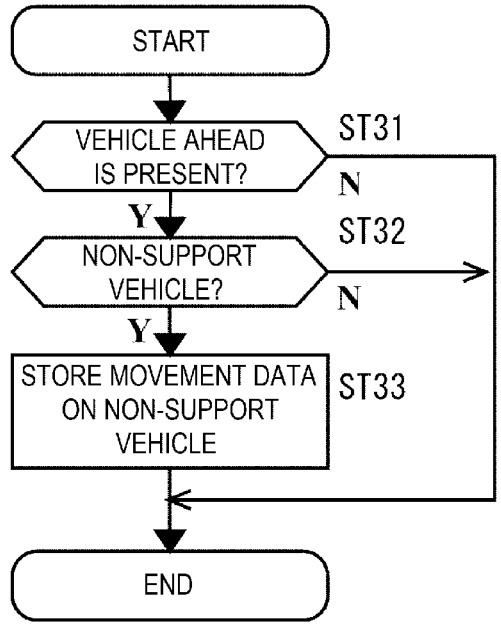
FIG. 8 is an explanatory diagram illustrating an example of detection processing of a non-support vehicle by a non-support managing unit in FIG. 4.

FIG. 8 is an explanatory diagram illustrating an example of detection processing of a non-support vehicle by the non-support managing unit 33 in FIG. 4.

The non-support managing unit 33 repeatedly executes the processing in FIG. 8 in a cycle of a fixed time, for example.

At a step ST31 in FIG. 8, the non-support managing unit 33 directly captures an image of another vehicle 2 travelling ahead of the host vehicle using the image capturing device 12 that is provided to the host vehicle, and determines whether another vehicle 2 is present ahead of the host vehicle.

If no another vehicle 2 is present ahead of the host vehicle, the non-support managing unit 33 ends the detection processing of a non-support vehicle in FIG. 8.

If another vehicle 2 is present ahead of the host vehicle, the non-support managing unit 33 determines whether the other vehicle 2 travelling ahead of the host vehicle is the non-support vehicle 2 relative to the traffic system 1, at a step ST32. If another vehicle 2 that is present ahead of the host vehicle supports the traffic system 1, there is a high possibility that the host vehicle has transmitted and received movement data to and from the other vehicle 2. Accordingly, the non-support managing unit 33 searches movement data in the memory 18, and determines whether movement data on the other vehicle 2 travelling ahead of the host vehicle is present. If the movement data on another vehicle 2 travelling ahead of the host vehicle is not present in the memory 18, the non-support managing unit 33 determines that the other vehicle 2 travelling ahead of the host vehicle is the non-support vehicle 2 relative to the traffic system 1. If the movement data on another vehicle 2 travelling ahead of the host vehicle is present in the memory 18, the non-support managing unit 33 determines that the other vehicle 2 travelling ahead of the host vehicle is not the non-support vehicle 2 relative to the traffic system 1.

If another vehicle 2 travelling ahead of the host vehicle is the support vehicle, the non-support managing unit 33 ends the detection processing of a non-support vehicle in FIG. 8.

If another vehicle 2 travelling ahead of the host vehicle is the non-support vehicle 2, the non-support managing unit 33 causes the processing to proceed to a step ST33.

At the step ST33, the non-support managing unit 33 generates movement data on the non-support vehicle travelling ahead of the host vehicle, and stores the movement data in the memory 18.

Based on detection data on the vehicle 2 that is present ahead of the host vehicle by the sensors of the host vehicle, the non-support managing unit 33 generates identification information, attribute information, position information, position detection time information, speed information and travel direction information on the non-support vehicle, a distance or a position from the host vehicle to the non-support vehicle, and the like, and generates the movement data.

For example, the non-support managing unit 33 generates, as identification information on a non-support vehicle, identification information indicating the non-support vehicle.

Moreover, the non-support managing unit 33 generates, as attribute information on a non-support vehicle, information on a size, a color, a vehicle type and a registration number of the vehicle 2 that is present ahead of the host vehicle and a distance or a position from the host vehicle to the non-support vehicle.

Figure 9:
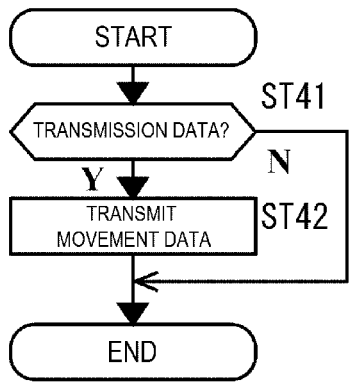
FIG. 9 is an explanatory diagram illustrating an example of processing of a transmitting controller in FIG. 4.

FIG. 9 is an explanatory diagram illustrating an example of processing of the transmitting controller 35 in FIG. 4.

For example, when new movement data on the host vehicle or a non-support vehicle is recorded in the memory 18, the transmitting controller 35 may repeatedly conduct the transmission processing in FIG. 9. Alternatively, the transmitting controller 35 may repeatedly conduct the transmission processing in FIG. 9 at a periodic timing.

At a step ST41 in the transmission processing in FIG. 9, the transmitting controller 35 determines whether the movement data stored in the memory 18 includes data to be transmitted.

If the movement data stored in the memory 18 does not include data to be transmitted, the transmitting controller 35 ends the transmission processing in FIG. 9.

If the movement data stored in the memory 18 includes data to be transmitted, at a step ST42, the transmitting controller 35 acquires the movement data to be transmitted from the memory 18, and outputs the movement data to be transmitted to the wireless communicating unit 11 for transmission. Thereafter, the transmitting controller 35 ends the transmission processing in FIG. 9.

With the processing in the foregoing, the movement data that is stored in the memory 18 is transmitted to the communication devices of the other movable bodies or the vehicle control system 10, as appropriate. Each of the communication devices of the other movable bodies or the vehicle control system 10 stores the movement data transmitted from the host vehicle in the memory 18 thereof, and uses the movement data for control of the movement thereof. When movement data on the host vehicle has been recorded in the memory 18, the transmitting controller 35 may transmit the movement data on the host vehicle with movement data on the other movable bodies, to the communication devices of the other movable bodies or the vehicle control system 10.

Figure 10:
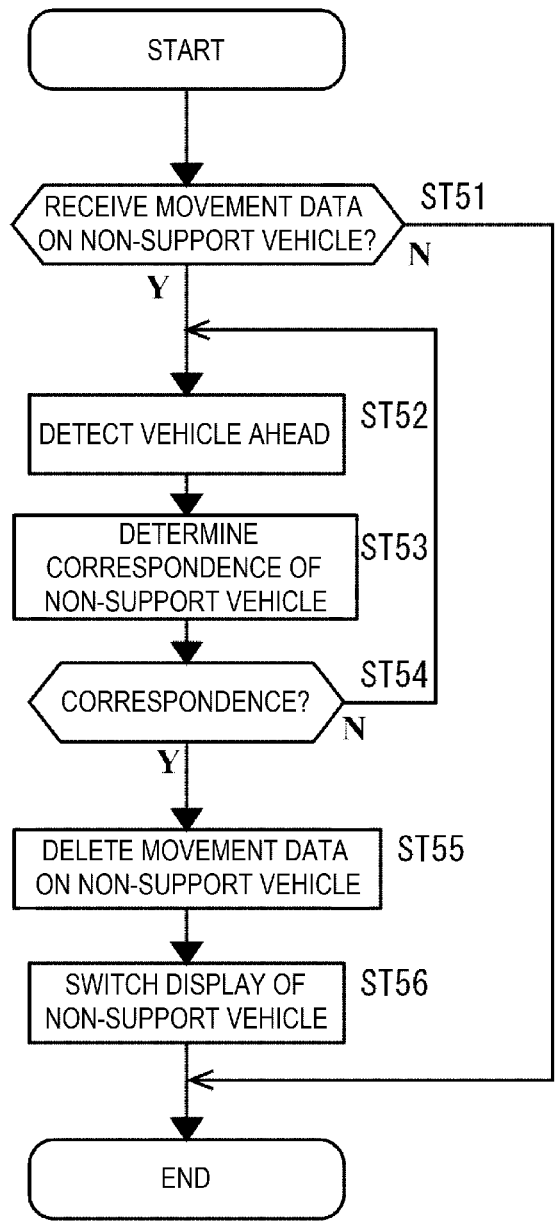
FIG. 10 is an explanatory diagram illustrating an example of reception processing of movement data on a non-support vehicle by the non-support managing unit in FIG. 4 according to a first embodiment of the disclosure.

FIG. 10 is an explanatory diagram illustrating an example of reception processing of movement data on a non-support vehicle by the non-support managing unit 33 in FIG. 4 according to the first embodiment of the disclosure.

For example, when the wireless communicating unit 11 has newly received movement data, the non-support managing unit may conduct the processing in FIG. 10 repeatedly. Alternatively, the non-support managing unit 33 may conduct the processing in FIG. 10 repeatedly at periodic timing.

At a step ST51 in FIG. 10, the non-support managing unit 33 determines whether movement data on a non-support vehicle has been received.

The non-support managing unit 33 reads movement data newly stored in the memory 18, and determines whether identification information on a non-support vehicle is included.

If no identification information on a non-support vehicle is included, that is, movement data on a non-support vehicle has not been received, the non-support managing unit 33 ends the reception processing for movement data in FIG. 10.

If movement data on a non-support vehicle has been received, at the step ST52, the non-support managing unit 33 detects another vehicle 2 passing by ahead of the host vehicle.

The non-support managing unit 33 captures an image ahead of the host vehicle using the image capturing device 12 or the like, and detects another vehicle 2 that crosses the captured image.

The non-support managing unit 33 detects a distance or a position from the host vehicle to the other vehicle 2 passing by ahead of the host vehicle.

At a step ST53, the non-support managing unit 33 determines a correspondence between detection data on the other vehicle 2 detected by the non-support managing unit 33 and the movement data on the non-support vehicle that has been stored in the memory 18.

For example, the non-support managing unit 33 determines a correspondence between a feature on the other vehicle 2 detected by the non-support managing unit 33 and a feature that is included in attribute information of the movement data on the non-support vehicle that has been stored in the memory 18.

Moreover, the non-support managing unit 33 may determine the correspondence by comparing a plurality of features and attributions, such as a size, a color, a vehicle type, and a number, about the vehicle 2 that are included in the detection data.

For example, the non-support managing unit 33 may determine the correspondence by comparing the detected distance or position from the host vehicle to the passing vehicle with a distance or a position about the non-support vehicle registered in the memory 18.

At a step ST54, the non-support managing unit 33 determines whether the other vehicle 2 detected by the non-support managing unit 33 corresponds with the non-support vehicle that has been stored in the memory 18.

If the other vehicle 2 detected by the non-support managing unit 33 does not correspond with the non-support vehicle that has been stored in the memory 18, the non-support managing unit 33 returns the processing to the step ST52. The non-support managing unit 33 repeats the correspondence determination from the step ST52 to the step ST54 until the correspondence can be determined.

If the other vehicle 2 detected by the non-support managing unit 33 corresponds with the non-support vehicle that has been stored in the memory 18, the non-support managing unit 33 causes the processing to proceed to a step ST55.

At the step ST55, the non-support managing unit 33 deletes the movement data related to the correspondence determination from the memory 18.

At a step ST56, the non-support managing unit 33 switches a display form in which the display member 23 displays the non-support vehicle 2.

For example, when the display member 23 displays a lock-on mark at the position of the non-support vehicle 2 before the detection of the passing, the non-support managing unit 33 causes the display member 23 to display the lock-on mark lightly, erases the lock-on mark, or switches a display form of the lock-on mark to a dot display form. This switches the display form in which the display member 23 displays information relating to the non-support vehicle 2 the passing of which has been detected, before and after the detection of the passing. Particularly, instead of by fully erasing the information relating to the non-support vehicle 2 on the display member 23, by displaying the information relating to the non-support vehicle 2 lightly or switching the display form to the dot display form so that the information relating to the non-support vehicle 2 is more inconspicuous, the occupant easily knows that the non-support vehicle 2 passes by, from the display member 23. An awkwardness, which occurs, for example, when the display suddenly disappears, is difficult to occur.

With the processing in the foregoing, the non-support managing unit 33 can delete or invalidate, when it is determined that the non-support vehicle 2 that is recorded in the memory 18 has passed by based on the detection data by the non-support managing unit 33, the movement data on the non-support vehicle from the memory 18, on a movable-body by movable-body basis.

As in the foregoing, in the present embodiment, movement data on the non-support vehicle 2 that cannot transmit or receive movement data to or from the host vehicle is acquired from the support vehicle 2 that can transmit and receive movement data to and from the host vehicle, and is stored and recorded in the memory 18. Moreover, the non-support managing unit 33 deletes or invalidates, when it is determined that the non-support vehicle 2 that is recorded in the memory 18 has passed by based on the detection data, the movement data on the non-support vehicle 2 from the memory 18, on the movable-body by movable-body basis.

Therefore, in the present embodiment, it is possible to store and record movement data related to a movement of the non-support vehicle 2 that does not support transmission or reception of the movement data in the memory 18, similarly to the support vehicle 2, and use the movement data for travelling and the like of the vehicles 2.

Moreover, in the present embodiment, when passing of another movable body is detected from the host vehicle, and it is determined that the non-support vehicle 2 that is recorded in the memory 18 has passed by based on the detection data, the movement data on the non-support vehicle 2 is deleted or invalidated from the memory 18 on the movable-body by movable-body basis.

Therefore, in the present embodiment, it is possible to excellently acquire, among movement data on a plurality of movable bodies that can be collected, not only the movement data on the support movable body but also the movement data on the non-support movable body, and excellently control the travelling and the like of the vehicle 2 based on the acquired movement data.

Moreover, even if a large amount of movement data is acquired from the traffic system 1 and is used for the control of the vehicle 2, it is possible to appropriately delete data from the memory 18. Thereby, the memory 18 is less likely to run out. Therefore, in the present embodiment, it is possible to effectively reduce such a possibility that the vehicle 2 cannot move forward at all or that an unnecessarily and excessively reacted movement of the vehicle 2 occurs.

In the present embodiment, a first vehicle 2 transmits movement data on a non-support vehicle 2 travelling ahead of the first vehicle 2 and being incapable of transmitting and receiving movement data. A second vehicle 2 having received this movement data detects passing of another movable body travelling ahead of the second vehicle 2, compares the received movement data with the detection data, and determines whether the other movable body the passing of which has been detected is the non-support vehicle 2. At this time, in the present embodiment, a correspondence is determined by comparing a plurality of features and attributions such as a size, a color, a vehicle type, a number, and a distance or a position of the movable body. Therefore, in the present embodiment, it is possible to determine the vehicle related to the comparison determination with high accuracy.

In the present embodiment, the display member 23 that displays another movable body switches the display form in which the display member 23 displays the non-support vehicle 2 the passing of which has been detected before and after the detection of the passing. Therefore, the occupant can know the passing of the non-support vehicle 2 through the display on the display member 23 since the mark assigned to the movable body changes.

Second Embodiment

Next, the traffic system 1 according to a second embodiment of the disclosure will be described. In the present embodiment, the same reference signs are used for configurations similar to those in the above-described embodiment, and illustration and description thereof will be omitted. The following description will focus on differences from the above-described embodiment.

Figure 11:
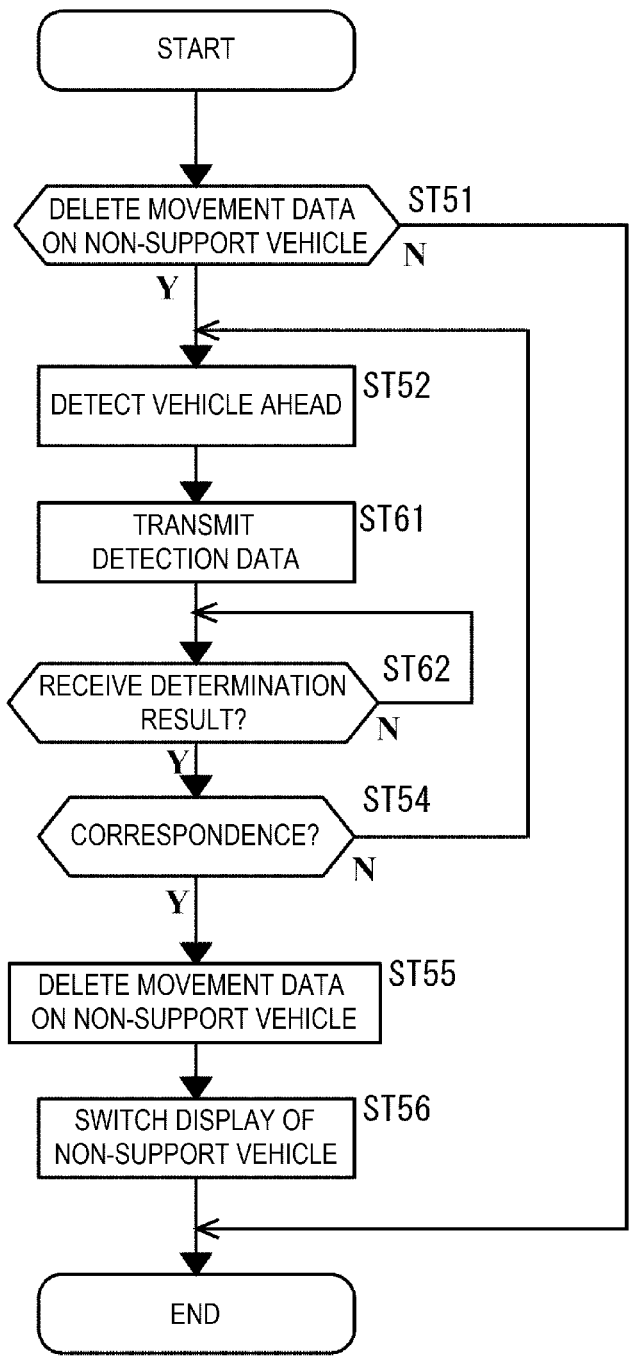
FIG. 11 is an explanatory diagram illustrating an example of reception processing of movement data on a non-support vehicle by the non-support managing unit in FIG. 4 according to a second embodiment of the disclosure.

FIG. 11 is an explanatory diagram illustrating an example of reception processing of movement data on a non-support vehicle by the non-support managing unit 33 in FIG. 4 according to the second embodiment of the disclosure.

For example, when the wireless communicating unit 11 has newly received movement data, the non-support managing unit may conduct the processing in FIG. 11 repeatedly. Alternatively, the non-support managing unit 33 may conduct the processing in FIG. 11 repeatedly at periodic timing.

The processing at from the steps ST51 to ST56 in FIG. 11 is similar to that at the steps ST51 to ST56 in FIG. 10 in the above-mentioned embodiment.

At the step ST51 in FIG. 11, if determining that movement data on a non-support vehicle has been received, the non-support managing unit 33 detects another vehicle 2 passing by ahead of the host vehicle, at the step ST52.

At a step ST61, the non-support managing unit 33 transmits the detection data from the wireless communicating unit 11 to another movable body.

The receiving controller 32 receives, from the support vehicle 2, together with movement data on the support vehicle 2, movement data on the non-support vehicle 2 travelling ahead of the support vehicle 2.

Therefore, the receiving controller 32 can easily determine the support vehicle 2 that is a transmission source of the movement data on the non-support vehicle 2, based on the reception data. The receiving controller 32 stores the movement data on the non-support vehicle 2 to which information on this transmission source is added, in the memory 18.

This enables the non-support managing unit 33 to easily determine a transmission destination of the detection data based on the movement data on the non-support vehicle 2 recorded in the memory 18.

The non-support managing unit 33 specifies the other movable body that is the transmission source of the movement data on the non-support vehicle 2 as a transmission destination, and transmits the detection data.

Figure 12:
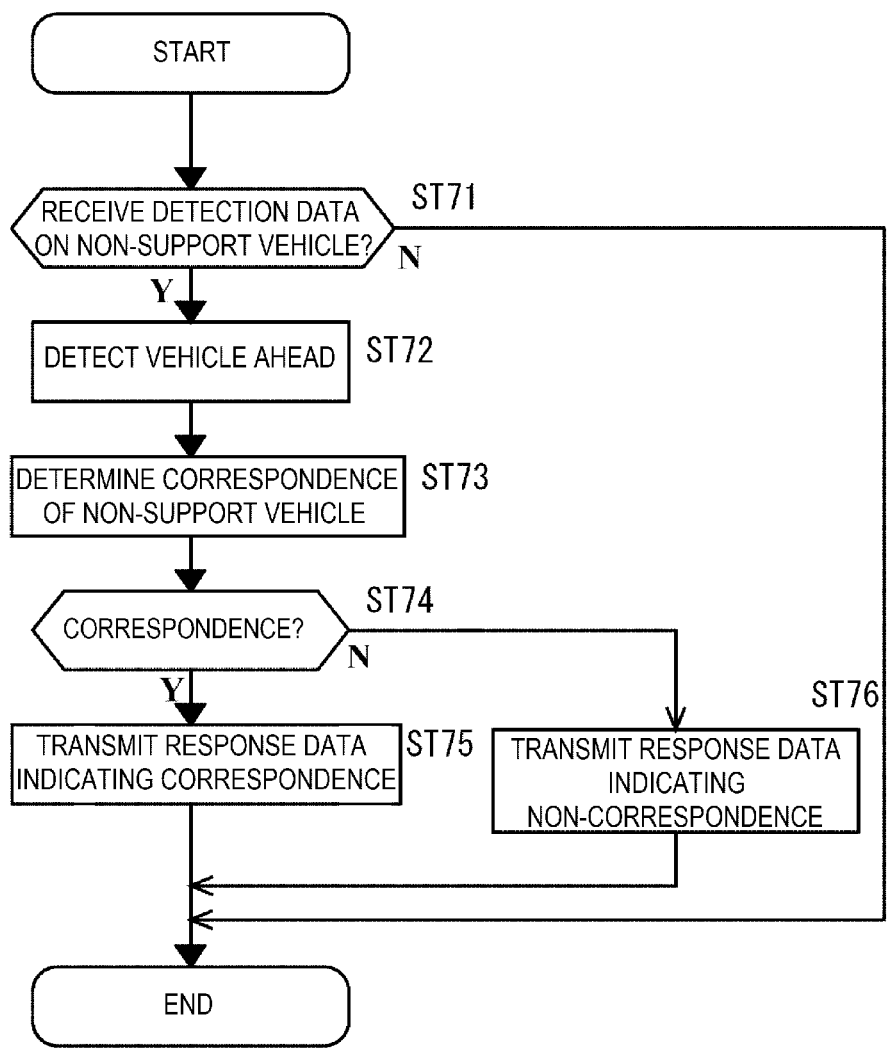
FIG. 12 is an explanatory diagram illustrating an example of correspondence determination processing by the non-support managing unit of another vehicle corresponding to the detection data in FIG. 11.

FIG. 12 is an explanatory diagram illustrating an example of correspondence determination processing by the non-support managing unit 33 of another vehicle corresponding to the detection data in FIG. 11.

For example, after the non-support managing unit 33 has transmitted movement data on the non-support vehicle 2 or when the wireless communicating unit 11 has newly received detection data, the non-support managing unit 33 executes the processing in FIG. 12 repeatedly.

At a step ST71 in FIG. 12, the non-support managing unit 33 determines whether movement data on a non-support vehicle 2 has been received by the wireless communicating unit 11.

If the movement data on the non-support vehicle 2 has not been received, the non-support managing unit 33 ends the reception processing for movement data in FIG. 12.

If the movement data on the non-support vehicle 2 has been received, at a step ST72, the non-support managing unit 33 detects another vehicle 2 passing by ahead of the host vehicle using the image capturing device 12 or the like.

At a step ST73, the non-support managing unit 33 determines whether the vehicle 2 indicated by the detection data detected by the other vehicle 2 and received corresponds with the non-support vehicle that is present ahead of the host vehicle. The correspondence determination at this time may be similar to that in the first embodiment.

At a step ST74, the non-support managing unit 33 determines whether the correspondence has been determined.

If the correspondence has been determined, at a step ST75, the non-support managing unit 33 transmits a determination result indicating the correspondence from the wireless communicating unit 11.

The non-support managing unit 33 specifies the vehicle 2 that has transmitted the detection data as a transmission destination, and transmits the determination result indicating the correspondence.

If the correspondence has not been determined, at a step ST76, the non-support managing unit 33 transmits a determination result indicating the non-correspondence from the wireless communicating unit 11.

The non-support managing unit 33 specifies the vehicle 2 that has transmitted the detection data as a transmission destination, and transmits the determination result indicating the non-correspondence.

Referring back to FIG. 11, after having transmitted the detection data at the step ST61, the non-support managing unit 33 waits for the reception of a determination result at a step ST62.

When receiving the determination result, the non-support managing unit 33 checks whether the correspondence has been determined in the determination result, at the step ST54.

If the other vehicle 2 detected by the non-support managing unit 33 does not correspond with the non-support vehicle that has been stored in the memory 18, the non-support managing unit 33 returns the processing to the step ST52. The non-support managing unit 33 repeats the correspondence determination from the step ST52 to the step ST54 until the correspondence can be determined.

If the other vehicle 2 detected by the non-support managing unit 33 corresponds with the non-support vehicle that has been stored in the memory 18, the non-support managing unit 33 causes the processing to proceed to a step ST55. Thereafter, the non-support managing unit 33 deletes the movement data related to the correspondence determination from the memory 18 at the step ST55, and switches the display form in which the display member 23 displays the non-support vehicle 2 at the step ST56.

With the processing in the foregoing, the non-support managing unit 33 deletes or invalidates, when it is determined that the non-support vehicle 2 that is recorded in the memory 18 in the support vehicle 2 has passed by based on the detection data, the movement data on the non-support vehicle 2 from the memory 18 on the movable-body by movable-body basis.

As in the foregoing, in the present embodiment, the detection data on the non-support vehicle 2 passing ahead of the host vehicle is transmitted to the support vehicle 2, and when it is determined in the support vehicle 2 that the non-support vehicle 2 that is recorded in the memory 18 has passed by, the movement data on the non-support vehicle 2 is deleted or invalidated from the memory 18 on the movable-body by movable-body basis.

Therefore, in the present embodiment, the passing is determined in the other movable body that has transmitted the movement data on the non-support vehicle 2. By determining the passing in the other movable body that is a transmission source, in the present embodiment, it is possible to appropriately determine whether the vehicle 2 the passing of which has been detected is the non-support vehicle 2.

That is, in the present embodiment, for example, a first vehicle 2 transmits movement data on a non-support vehicle 2 travelling ahead of the first vehicle 2 and being incapable of transmitting and receiving movement data. The second vehicle 2 having received this movement data detects passing of a movable body, and transmits the detection data to the first vehicle 2. The first vehicle 2 having received this movement data detects the non-support vehicle 2 travelling ahead of the first vehicle 2, compares the detection data with the received detection data, and determines whether the other movable body the passing of which has been detected is the non-support vehicle 2. Moreover, the first vehicle 2 transmits the determination result, and the second vehicle 2 deletes the movement data on the non-support vehicle 2 based on the received determination result.

Therefore, it is possible to determine whether the non-support vehicle 2 passes by with higher accuracy than a case where the whether the non-support vehicle 2 passes by is determined in the second vehicle 2 that detects the passing of the movable body.

In the present embodiment, the movement data on the non-support vehicle 2 travelling ahead of the support vehicle 2 is acquired from the support vehicle 2 together with movement data on the support vehicle 2.

Therefore, it is possible for the vehicle 2 that receives the movement data on the non-support vehicle 2 to easily distinguish the support vehicle 2 that is a transmission source thereof.

Third Embodiment

Next, the traffic system 1 according to a third embodiment of the disclosure will be described. In the present embodiment, the same reference signs are used for configurations similar to those in the above-described embodiment, and illustration and description thereof will be omitted. The following description will focus on differences from the above-described embodiment.

Figure 13:
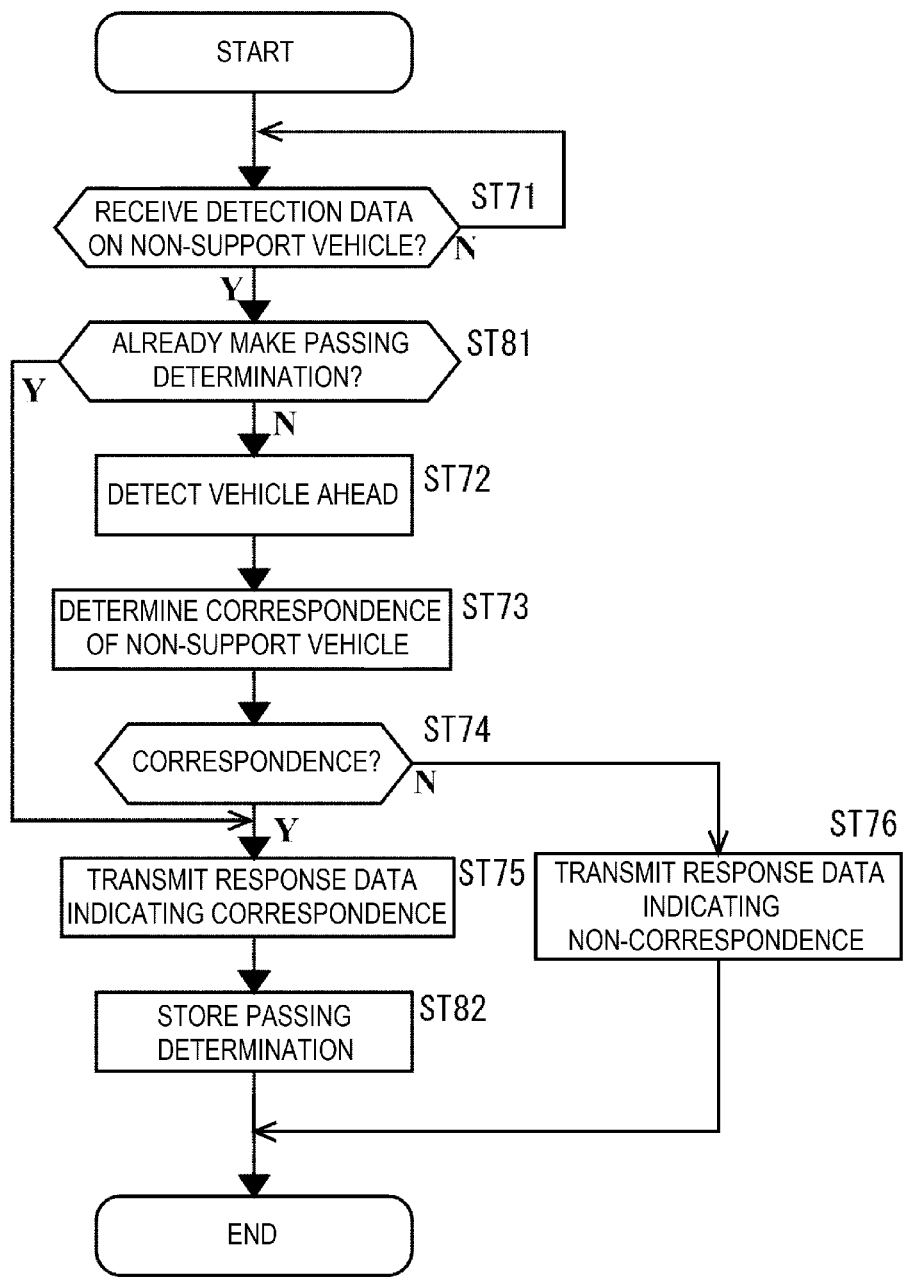
FIG. 13 is an explanatory diagram illustrating an example of correspondence determination processing by the non-support managing unit of another vehicle according to a third embodiment of the disclosure.

FIG. 13 is an explanatory diagram illustrating an example of correspondence determination processing by the non-support managing unit 33 of another vehicle in the third embodiment of the disclosure.

For example, after the non-support managing unit 33 has transmitted the movement data on the non-support vehicle 2 or when the wireless communicating unit 11 has newly received detection data, the non-support managing unit 33 executes the processing in FIG. 13 repeatedly.

The processing from the steps ST71 to ST76 in FIG. 13 is similar to that at the steps ST71 to ST76 in FIG. 12 in the above-mentioned embodiment.

At the step ST71 in FIG. 13, after determining that detection data on a non-support vehicle 2 has been received, the non-support managing unit 33 determines whether a passing determination for the non-support vehicle 2 has been made, at a step ST81.

If the passing determination for the non-support vehicle 2 has been already made, the non-support managing unit 33 causes the processing to proceed to the step ST75.

If the passing determination for the non-support vehicle 2 has not been made, the non-support managing unit 33 causes the processing to proceed to the step ST72, and makes a passing correspondence determination based on the detection data newly received from the step ST72 to the step ST74.

At the step ST74, if the non-correspondence has been determined, at the step ST76, the non-support managing unit 33 transmits a determination result indicating the non-correspondence. Thereafter, the non-support managing unit 33 ends the processing in FIG. 13.

If the correspondence has been determined at the step ST74, the non-support managing unit 33 causes the processing to proceed to the step ST75.

At the step ST75, the non-support managing unit 33 transmits a determination result indicating the correspondence from the wireless communicating unit 11.

Thereafter, at a step ST82, the non-support managing unit 33 stores the determination result indicating the correspondence in the memory 18, and ends the processing in FIG. 13.

The passing determination result indicating the correspondence is stored in the memory 18 in this manner, so that the non-support managing unit 33 can determine whether the passing determination for the non-support vehicle 2 has been already made at the step ST81.

It should be noted that the passing determination result indicating the correspondence stored in the memory 18 at the step ST82 may be deleted or invalidated from the memory 18 when the host vehicle is passing by the determination point, for example.

As in the foregoing, in the present embodiment, the correspondence determination result about the passing is stored and held in the memory 18, and the determination result stored in the memory is transmitted in response to a correspondence determination request thereafter.

Therefore, in the present embodiment, when the passing about the non-support vehicle 2 has already been determined, it is possible to instantaneously transmit the correspondence determination result about the passing without newly making a passing determination.

It should be noted that the passing determination result may be held in an infrastructure such as the server apparatus 6.

Moreover, in the vehicle 2 that transmits the correspondence determination result about the passing, the transmitting controller 35 may spontaneously transmits, after the correspondence determination about the passing, the determination result held in the memory 18 as the movement data on the non-support vehicle 2.

Accordingly, in the vehicle 2 that detects the passing of the non-support vehicle 2, even when the non-support vehicle 2 passing by is difficult to be grasped, it is possible to acquire the correspondence determination result based on the detection by the other vehicle 2, and delete or invalidate movement data on the non-support vehicle 2 that has passed by from the memory 18.

The embodiments in the foregoing are preferred examples of the disclosure. It should be noted that the disclosure is not limited to these embodiment. Many modifications and changes may be made to the embodiment without departing from the sprit and scope of the disclosure.

For example, in the above embodiments, the vehicle control system 10 and the communication device which are provided to the movable body use the movable body monitoring unit 34 and the travel controller 36 in order to control the movement of the vehicle 2 based on the movement data stored in the memory 18.

Alternatively, for example, the vehicle control system 10 and the communication device that are provided to the movable body may conduct processing similar to that of the movable body monitoring unit 34 in the processing of the travel controller 36, and simply use the travel controller 36. In this case, the travel controller 36 may conduct processing similar to that of the movable body monitoring unit 34 at the step ST23 in FIG. 7, for example. Moreover, when the movable body monitoring unit 34 is integrated with the travel controller 36, the travel controller 36 may update, without assigning a monitoring level, the course so as to adjust the course, using the monitoring determination result as it is.

In the above embodiments, in the vehicle control system 10 and the communication device that are provided to the movable body, the receiving controller 32 manages movement data to be recorded in the memory.

Alternatively, for example, the vehicle control system 10 and the communication device that are provided to the movable body may be provided with a memory managing unit, independent of the receiving controller 32.

In the above embodiments, the vehicle control system 10 and the communication device that are provided to the movable body includes the travel controller 36 and the transmitting controller 35.

Alternatively, for example, the vehicle control system 10 and the communication device that are provided to the movable body may integrate the transmitting controller 35 with the travel controller 36, and cause the travel controller 36 to conduct the transmission processing of the movement data. In this case, the travel controller 36 may transmit the stored movement data on the host vehicle by the wireless communicating unit 11, after the processing at the step ST26 in FIG. 7, for example.

In the above embodiments, the vehicle control system 10 provided to the vehicle 2 is provided with the respect units illustrated in FIG. 4. Alternatively, for example, the vehicle control system 10 may be provided with a part of the functions in FIG. 4. Moreover, the vehicle control system 10 may be provided with all of the functions in FIG. 4 by the remaining functions in FIG. 4 being provided by a mobile terminal, for example, with respect to the part of the functions in FIG. 4, which are uniquely provided.

Moreover, the vehicle control system 10 may be provided a part of the functions in FIG. 4, and may conduct the above-mentioned various processing in that state. The vehicular communication devices 22 may be provided with a part of the functions in FIG. 4, as the host vehicle sensor to be mounted on the vehicle 2, for example. Specifically, when conducting the control other than the travel in the vehicle 2, the vehicle control system 10 does not need to be provided with all the host vehicle sensors in FIG. 4, the operation member 17, and the path generator 37 of the ECU 20. Even in this case, the vehicular communication devices 22 that is provided to the vehicle control system 10 configures the traffic system 1 that transmits and receives movement data and the like to and from the server apparatus 6.

In the above embodiments, the vehicular communication device 22 has been described as a part of the vehicle control system 10. A control system for a low-speed movable body such as the pedestrian 3 and a bicycle may be also provided with functions similar to those of the above-mentioned the vehicular communication device 22. Moreover, the above-mentioned vehicle control system 10 and the vehicular communication device 22 may be also applied to the vehicle 2 of a different type, such as an electric train, other than the vehicle 2.

The invention claimed is:

1. A movable body monitoring apparatus, comprising:
   a controller configured to:
   acquire movement data on a non-support movable body, incapable of transmitting and receiving the movement data to and from a host vehicle, from a support movable body capable of transmitting and receiving the movement data to and from the host vehicle;
   store and record the movement data on the non-support movable body in a memory, wherein the recorded movement data on the non-support movable body includes a feature of the non-support movable body;
   detect passing of a specific movable body from the host vehicle;
   manage the movement data on the non-support movable body recorded in the memory;
   compare a feature of the detected specific movable body with the feature of the non-support movable body recorded in the memory;
   determine a correspondence between detection data of the detected specific movable body and the movement data on the non-support movable body recorded in the memory, wherein
   the correspondence is determined based on the comparison of the feature of the detected specific movable body with the feature of the non-support movable body recorded in the memory;
   determine that the specific movable body corresponds to the non-support movable body based on the determination of the correspondence between the detection data of the detected specific movable body and the movement data on the non-support movable body recorded in the memory;
   invalidate or delete the movement data on the non-support movable body from the memory on a movable-body by movable-body basis, wherein the movement data on the non-support movable body is invalidated or deleted from the memory based on the determination that the specific movable body that has passed the host vehicle corresponds to the non-support movable body; and
   control the host vehicle based on the invalidation or the deletion of the movement data on the non-support movable body from the memory.

2. The movable body monitoring apparatus according to claim 1, further comprising:
   a transmitter configured to transmit the detection data to the support movable body.

3. The movable body monitoring apparatus according to claim 2, wherein the controller is further configured to acquire, together with movement data on the support movable body, the movement data on the non-support movable body travelling ahead of the host vehicle.

4. The movable body monitoring apparatus according to claim 2, further comprising:
a display configured to:
  display a plurality of movable bodies; and
  switch a display form in which the non-support movable body, the passing of which has been detected is displayed before and after the detection of the passing.

5. A vehicle control system, comprising:
the movable body monitoring apparatus according to claim 2; and
a vehicle control apparatus configured to control a vehicle on a basis of monitoring by the movable body monitoring apparatus.

6. A traffic system, comprising:
the movable body monitoring apparatus according to claim 2; and
a server apparatus configured to transmit and receive movement data related to movements of a plurality of movable bodies to and from the movable body monitoring apparatus.

7. The movable body monitoring apparatus according to claim 1, wherein the controller is further configured to acquire, together with movement data on the support movable body, the movement data on the non-support movable body travelling ahead of the host vehicle.

8. The movable body monitoring apparatus according to claim 1, further comprising:
a display configured to:
  display a plurality of second movable bodies; and
  switch a display form in which the non-support movable body, the passing of which has been detected, is displayed before and after the detection of the passing.

9. A vehicle control system, comprising:
the movable body monitoring apparatus according to claim 1; and
a vehicle control apparatus configured to control a vehicle on a basis of monitoring by the movable body monitoring apparatus.

10. A traffic system, comprising:
the movable body monitoring apparatus according to claim 1; and
a server apparatus configured to transmit and receive movement data related to movements of a plurality of movable bodies to and from the movable body monitoring apparatus.

11. A movable body monitoring apparatus, comprising:
a transmitter configured to transmit movement data on a non-support movable body to a first movable body, wherein the non-support movable body is travelling ahead of a host vehicle and is incapable of transmitting and receiving the movement data;
a receiver configured to receive, from the first movable body having received the movement data on the non-support movable body, detection data indicating that passing of a second movable body has been detected;
a controller configured to:
  detect the non-support movable body travelling ahead of the host vehicle;
  compare a feature in the detection data of the second movable body with a feature of the detected non-support movable body;
  determine a correspondence between the received detection data of the second movable body and detection data of the detection of the non-support movable body, wherein the correspondence is determined based on the comparison of the feature of the second movable body with the feature of the detected non-support movable body; and
  determine whether the second movable body, the passing of which has been detected by the first movable body, is the non-support movable body, wherein
    the determination that the second movable body is the non-support movable body is based on the determination of the correspondence between the received detection data of the second movable body and the detection data of the non-support movable body, and
  the transmitter is further configured to transmit, to the first movable body, a determination result as to whether the second movable body, the passing of which has been detected by the first movable body, is the non-support movable body.

12. The movable body monitoring apparatus according to claim 11, wherein the controller is further configured to compare a plurality of features and attributions related to the second movable body included in the detection data.

13. The movable body monitoring apparatus according to claim 12, further comprising:
a memory configured to store the determination result as to whether the second movable body, the passing of which has been detected by the first movable body, is the non-support movable body, wherein
the transmitter is further configured to transmit the determination result stored in the memory.

14. The movable body monitoring apparatus according to claim 11, further comprising:
a memory configured to store the determination result as to whether the second movable body, the passing of which has been detected by the first movable body, is the non-support movable body, wherein
the transmitter is further configured to transmit the determination result stored in the memory.

15. A movable body monitoring apparatus, comprising circuitry configured to:
acquire movement data on a non-support movable body, incapable of transmitting and receiving the movement data to and from a host vehicle, from a support movable body capable of transmitting and receiving the movement data to and from the host vehicle;
store and record the acquired movement data on the non-support movable body in a memory, wherein the recorded movement data on the non-support movable body includes a feature of the non-support movable body;
detect passing of a specific movable body from the host vehicle;
manage the recorded movement data on the non-support movable body;
compare a feature of the detected specific movable body with the recorded feature of the non-support movable body;
determine a correspondence between detection data of the detected specific movable body and the recorded movement data on the non-support movable body, wherein
the the correspondence is determined based on the comparison of the feature of the detected specific movable body with the recorded feature of the non-support movable body;
determine that the specific movable body corresponds to the non-support movable body based on the determination of the correspondence between the detection data of the detected specific movable body and the recorded movement data on the non-support movable body;

invalidate or delete the movement data on the non-support movable body on a movable-body by movable-body basis, wherein the movement data on the non-support movable body is invalidated or deleted from the memory based on the determination that the specific movable body that has passed the host vehicle corresponds to the non-support movable body; and control the host vehicle based on the invalidation or the deletion of the movement data on the non-support movable body from the memory.

16. A movable body monitoring apparatus, comprising circuitry configured to:

transmit movement data on a non-support movable body to a first movable body, wherein the non-support movable body is travelling ahead of a host vehicle and is incapable of transmitting and receiving the movement data;

receive, from the first movable body having received the movement data on the non-support movable body, detection data indicating that passing of a second movable body has been detected;

detect the non-support movable body travelling ahead of the host vehicle;

compare a feature in the detection data of the second movable body with a feature of the detected non-support movable body;

determine a correspondence between the received detection data of the second movable body and detection data of the detection of the non-support movable body, wherein the correspondence is determined based on the comparison of the feature of the second movable body with the feature of the detected non-support movable body;

determine whether the second movable body, the passing of which has been detected by the first movable body, is the non-support movable body, wherein the determination that the second movable body is the non-support movable body is based on the determination of the correspondence between the received detection data of the second movable body and the detection data of the non-support movable body; and transmit, to the first movable body, a determination result as to whether the second movable body, the passing of which has been detected by the first movable body, is the non-support movable body.

* * * * *